(No Model.)

J. M. FINCH.
ROTATING GRAIN METER.

No. 517,608. Patented Apr. 3, 1894.

Witnesses,
J. H. Arnse
J. A. Bayless

Inventor,
John M. Finch
By Dewey & Co.
Attys

THE NATIONAL LITHOGRAPHING COMPANY,
WASHINGTON, D. C.

UNITED STATES PATENT OFFICE.

JOHN M. FINCH, OF MARYSVILLE, CALIFORNIA, ASSIGNOR OF ONE-HALF TO FRANK MILLER, OF SAME PLACE.

ROTATING GRAIN-METER.

SPECIFICATION forming part of Letters Patent No. 517,608, dated April 3, 1894.

Application filed March 17, 1893. Serial No. 466,441. (No model.)

*To all whom it may concern:*

Be it known that I, JOHN M. FINCH, a citizen of the United States, residing at Marysville, Yuba county, State of California, have invented an Improvement in Automatic Weighing Apparatus; and I hereby declare the following to be a full, clear, and exact description of the same.

My invention relates to that class of weighing apparatus in which a rotary wheel, having upon its periphery suitable receptacles for the material to be weighed, has connected with it a check or balance adapted to retard its movement sufficiently and proportionately to establish a relationship between the weight of material acting upon the wheel, and the number of its rotations.

My invention consists in the novel construction and arrangement of the apparatus which I shall hereinafter fully describe and specifically claim.

Figure 1:
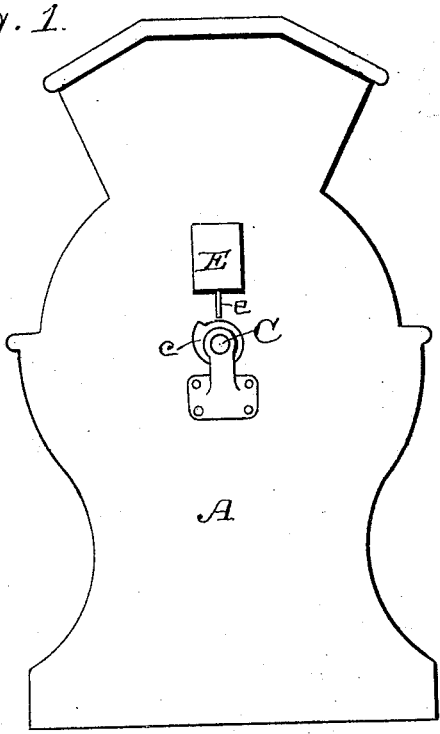
Figure 2:
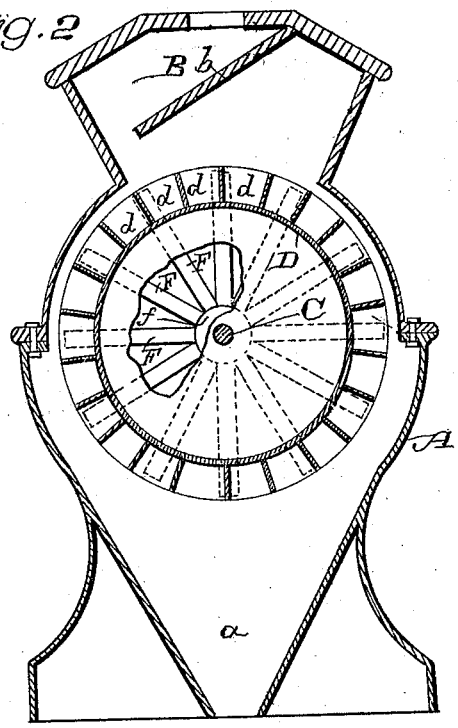
Figure 3:
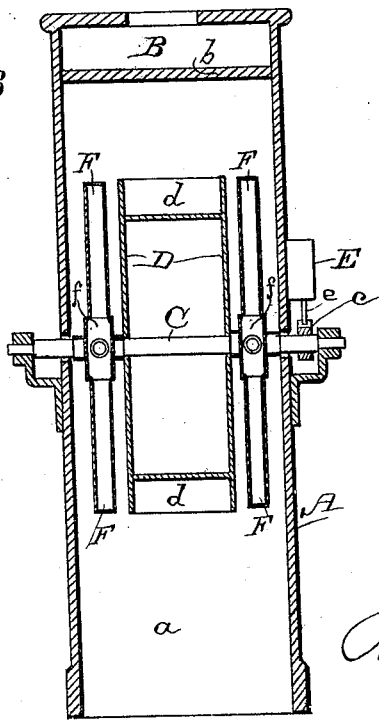

Referring to the accompanying drawings for a more complete explanation of my invention,—Figure 1 is a front view of my apparatus. Fig. 2 is a vertical longitudinal section. Fig. 3 is a vertical cross section.

A is a suitable frame or stand having in its lower portion a discharge $a$ and at its upper portion a feed hopper B provided with a directing board $b$ for guiding the material to the weighing wheel.

Journaled in the frame A is a shaft C on which the wheel D is mounted. This wheel has upon its periphery a number of compartments or buckets $d$ which receive the stream of material from the directing board $b$ at a point to one side of its perpendicular line, whereby the weight of the material tends to rotate the wheel. To provide a suitable resistance to the weight of the material, one which is automatic in its action, and conformable to the different amounts of material supplied to the wheel, I have a check or balance which consists of a hollow hub $f$ secured upon the shaft C, preferably one on each side, and provided with hollow radial arms F which communicate with the hollow hub. In this hub is placed a liquid, or any material, such as shot, sand, &c., which will flow like a liquid. This material will flow by gravity from one hollow arm to the other, as the parts rotate, and will thus serve as a check to balance the wheel. It will now be seen that when the grain is allowed to flow upon the wheel, it will load one side until the material in the arms F is balanced, and as it continues to revolve it must raise the checking material a given height, and it will, therefore, require a given amount of grain to revolve the wheel, and it will require this amount regardless of the time it takes to supply it. That is to say, if it takes one hundred pounds to turn the wheel one complete revolution, it will make no difference whether these one hundred pounds run on in one minute or in two, or in five minutes. In other words, the number of revolutions of the wheel is directed by the amount of grain or weight placed upon the outside buckets.

Now, if the machine be placed so that a running stream of material will pass through or over it, and it be adjusted, say, to one hundred pounds, then a tally upon the machine registering the number of revolutions of the wheel, will indicate a result of as many hundred pounds as the number of revolutions the wheel has made, and thus it is an easy matter to determine the amount of material that has passed any given point.

Any suitable tally may be used, and for this purpose I have shown on the shaft C a cam $c$ which operates against the arm or finger $e$ of a register E, the details of which need not be described.

The bearings of the shaft C may be of any suitable pattern, anti-friction or otherwise, provided the friction is constant.

Having thus described my invention, what I claim as new, and desire to secure by Letters Patent, is—

1. An automatic weighing apparatus consisting of a rotary wheel adapted to receive upon its periphery the material to be weighed, and to be rotated by the imposition of said material, and a check or balance connected with the wheel, and consisting of a series of hollow arms exterior of the wheel, and upon each side thereof, said arms communicating with each other and adapted to contain a flowing material which is successively and continuously discharged from one to the other by their rotation, substantially as herein described.

2. An automatic weighing apparatus consisting of a rotary wheel having on its periphery a series of receptacles adapted to receive the material to be weighed, said wheel being rotated by the material in said receptacles, and a check or balance connected with the wheel and rotated thereby and consisting of a hollow hub and a series of radially disposed communicating hollow arms exterior of the wheel and containing a flowing material which is successively and constantly discharged from one to the other by their rotation, substantially as herein described.

3. An automatic weighing apparatus consisting of a frame or stand having mounted within it a rotary wheel having a series of receptacles upon its periphery, a supply hopper for directing the material to be weighed into said receptacles to one side of the vertical plane of the wheel whereby the latter is rotated by the imposition of the material, and a check or balance consisting of a series of communicating hollow arms radially disposed upon opposite sides of the exterior of the wheel, the arms communicating at their inner ends and connected with said wheel and adapted to be rotated thereby, said arms containing a flowing material which is successively and constantly discharged from one to the other by their rotation, substantially as herein described.

4. An automatic weighing apparatus consisting of a rotary wheel upon the periphery of which the material to be weighed is imposed whereby the wheel is rotated, a check or balance consisting of a hollow hub exterior of the wheel and mounted on its shaft, a series of communicating radially disposed hollow arms connected with said hub and adapted to contain a flowing material which is successively and constantly discharged from each arm into succeeding ones as they revolve, and a register connected with said wheel to indicate the number of its revolutions, substantially as herein described.

5. An automatic weighing apparatus consisting of a rotary wheel adapted to receive the material to be weighed upon its periphery, whereby said wheel is rotated, a hollow hub secured outside of the wheel and upon the shaft of the latter, and radial hollow arms carried by and communicating with said hub, and containing a flowing material serving to check and balance the wheel, substantially as herein described.

6. An automatic weighing apparatus, consisting of a rotary wheel having on its periphery a series of receptacles or buckets for the material to be weighed, a feed hopper adapted to supply said material to the buckets to one side of the perpendicular line of the wheel, a hollow hub secured to the shaft of said wheel exterior of the latter, and radial hollow arms carried by and communicating with the hub, and containing a flowing material to check and balance the wheel, and a registering device connected with said wheel for indicating the number of its revolutions, substantially as herein described.

In witness whereof I have hereunto set my hand.

JOHN M. FINCH.

Witnesses:
H. SILBERSTEIN,
FRANK MILLER.